United States Patent
Matsushita

(10) Patent No.: US 6,694,022 B1
(45) Date of Patent: Feb. 17, 2004

(54) DIGITAL BROADCASTING RECEIVER

(75) Inventor: Koji Matsushita, Saijyo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/423,009

(22) PCT Filed: Mar. 9, 1999

(86) PCT No.: PCT/JP99/01133
§ 371 (c)(1),
(2), (4) Date: Feb. 15, 2000

(87) PCT Pub. No.: WO99/46933
PCT Pub. Date: Sep. 16, 1999

(30) Foreign Application Priority Data

Mar. 9, 1998 (JP) .......... 10-056355

(51) Int. Cl.[7] ............... G06F 1/24
(52) U.S. Cl. ......... 380/201; 380/210; 713/164; 713/200; 713/201
(58) Field of Search ........... 380/201, 210; 713/164, 200, 201

(56) References Cited

U.S. PATENT DOCUMENTS

| | | | | |
|---|---|---|---|---|
| 5,574,787 A | * | 11/1996 | Ryan | ........... 380/201 |
| 5,799,081 A | | 8/1998 | Kim et al. | |
| 5,991,500 A | * | 11/1999 | Kanota et al. | ........... 386/94 |

FOREIGN PATENT DOCUMENTS

| | | |
|---|---|---|
| EP | 0 869 485 | 10/1998 |
| JP | 9-284747 | 10/1997 |
| JP | 9-307543 | 11/1997 |
| JP | 10-283653 | 10/1998 |
| KR | 0019625 | 4/1997 |

* cited by examiner

Primary Examiner—Thomas R. Peeso
(74) Attorney, Agent, or Firm—Wenderoth, Lind & Ponack, L.L.P.

(57) ABSTRACT

A digital broadcasting receiver includes a tuner unit for receiving digital broadcasting in formation, an information storage unit for storing the digital broadcasting information together with copyright information, and a decoder unit for decoding the digital broadcasting information into an output signal in a form to be displayed. When a copy-disallowance signal is detected during an operation for reading and reproducing digital broadcasting information from the information storage unit, by employing a reproducing pointer, the digital broadcasting receiver simultaneously erases the digital broadcasting information by employing a simultaneous erasing pointer. On the other hand, when a copy-disallowance signal is detected while digital broadcasting information is being received and stored in the information storage unit, the digital broadcasting receiver inhibits outputting the received digital broadcasting information as an output signal in a form to be displayed through the decoder unit. Thereby, the digital broadcasting receiver can satisfy the condition of disallowing the copying of copyright protected digital broadcasting by realizing the copyright protection for digital broadcasting information, and can shift a viewing time of the digital broadcasting information to a later time.

35 Claims, 9 Drawing Sheets

Fig.8

| input operation state | copy flag state | SW14 |
|---|---|---|
| direct receive and output | allow to copy | display received video image (selector SW is 1) |
| | unable to copy | display received video image (selector SW is 1) |
| indirect receive and store | allow to copy | display received video image (selector SW is 1) |
| | unable to copy | no screen display (selector SW is open) |
| indirect receive and reproduce | allow to copy | display reproduced screen (selector SW is 2) |
| | unable to copy | display reproduced screen (selector SW is 2) |

Fig.9

| input operation state | copy flag state | SW54 | SW69 |
|---|---|---|---|
| direct receive and output | allow to copy | display received video image (selector SW is 1) | connected |
|  | unable to copy | display received video image (selector SW is 1) | open |
| indirect receive and store | allow to copy | display received video image (selector SW is 1) | connected |
|  | unable to copy | display message screen (selector SW is 3) | connected |
| indirect receive and reproduce | allow to copy | display reproduced screen (selector SW is 2) | no relationship |
|  | unable to copy | display reproduced screen (selector SW is 2) | no relationship |

DIGITAL BROADCASTING RECEIVER

BACKGROUND OF THE INVENTION

1. Field of the Invention

The present invention relates to a digital broadcasting receiver and, more particularly, to a digital broadcasting receiver which is characterized in that illegal copying is inhibited to be carried out for digital broadcasting which is copyright protected.

2. Description of the Related Art

Conventionally, when a digital broadcasting receiver displays a received video signal, if the received video signal is disallowed to be copied, the digital broadcasting receiver puts a copy-guard on an output video signal which is to be displayed.

FIG. 7 is a diagram illustrating a structure of a prior art digital broadcasting receiver. In FIG. 7, reference numeral 1 denotes a digital broadcasting receiver. Numeral 2 denotes a tuner. Numeral 3 denotes a transport decoder. Numeral 4 denotes a selector switch. Numeral 5 denotes an MPEG decoder. Numeral 6 denotes an NTSC encoder. Numeral 7 denotes a digital interface. Numeral 8 denotes copy flag information.

Hereinafter, an operation of the digital broadcasting receiver having such a conventional structure will be described.

The tuner 2 is connected to an antenna. Digital broadcasting that is received by the tuner 2 is digital-demodulated and the demodulated broadcasting is input to the transport decoder as a data sequence in the form of a transport stream. A plurality of programs and control information are multiplexed in the data sequence in the form of a transport stream. One program is selected among the plurality of programs by the transport decoder 3, and copy flag information as to whether copying to an external recording device is allowed or disallowed is separated from the data sequence in the form of a transport stream. In normal receiving, the selector switch 4 is switched to be connected to a side of the transport decoder. The program data is MPEG-decoded by the MPEG decoder 5, and a digital video image and a voice signal are output. The digital video signal among those is converted into a television signal by the NTSC encoder 6 and the television signal is output. The copy flag information 8 separated by the transport decoder 3 is connected to the digital interface 7 and the NTSC encoder 6. When the copy flag information 8 shows that copying to an external recording device is disallowed, the digital interface 7 inserts information indicating the disallowance of copying into the digital output of the program data. Further, the NTSC encoder 6 inserts a copy protect pulse into the television signal that is output from the NTSC encoder 6.

As described above, when a received video signal is disallowed to be copied to an external recording device, the prior art digital broadcasting receiver cannot record broadcasting on a VTR or the like. Therefore, a viewer is always required to view broadcasting at the instant time when the broadcasting is received.

The present invention is made in consideration of the above problems, and it is an object of the present invention to provide a digital broadcasting receiver which enables viewing the broadcasting at a time later than when the broadcasting is received, and which can satisfy a condition of disallowance of copying when the broadcasting which is disallowed to be copied is received.

In order to solve the above problems, a digital broadcasting receiver according to the present invention comprises: a tuner unit for receiving digital broadcasting information including copyright information, which shows whether copying to an external device is allowed or not, and for detecting the copyright information in the received digital broadcasting information; an information storage unit for storing the received digital broadcasting information together with the copyright information detected in the received digital broadcasting information; and a decoder unit for decoding the received digital broadcasting information or digital broadcasting information read out from the information storage unit into an output signal in a form to be displayed. When a copy-disallowance signal is detected in the digital broadcasting information read out from the information storage unit, the digital broadcasting receiver according to the present invention erases digital broadcasting information which is stored in the information storage unit and which has been successively read out therefrom during a reproduction operation in which the digital broadcasting information is read out from the information storage unit and is reproduced and displayed on a display device.

In addition, when a copy-disallowance signal included in the copyright information, which is included in the received digital broadcasting information, is detected while the received digital information is stored in the information storage unit, the digital broadcasting receiver, during receiving digital information, inhibits outputting the received digital information as an output signal in a form to be displayed through the decoder unit. Further, when a copy-disallowance signal included in the copyright information, which is included in the received digital information, is detected while the digital information is being stored in the information storage unit, the digital broadcasting receiver outputs a message screen signal, which is prepared in advance, to an output unit for outputting an output signal in a form to be displayed.

According to the present invention, even when the received video signal is one that is disallowed to be copied to an external recording device, the viewer can view broadcasting at a time later than when the broadcasting is received with the attendant copyright protection at that time being assured.

In addition, according to the present invention, in order to further assure the copyright protection, outputting of the video signal which is being received is inhibited while the digital broadcasting information which is disallowed to be copied is being stored, whereby the number of viewing times for the program under the copyright protection is limited to only one time.

SUMMARY OF THE INVENTION

A digital broadcasting receiver according to a first aspect of the present invention comprises: a tuner unit for receiving digital broadcasting information including copyright information which shows whether copying to an external device is allowed or not and detecting the copyright information included in the received digital broadcasting information; an information storage unit for storing the received digital broadcasting information together with the copyright information detected in the received digital broadcasting information; and a decoder unit for decoding the received digital broadcasting information or digital broadcasting information read out from the information storage unit into an output signal in a form to be displayed. When a copy-disallowance signal is detected in the digital broadcasting information read out from the information storage unit, the digital broadcasting receiver erases digital broadcasting information which is stored in the information storage unit and which has been successively read out therefrom during a reproduction operation for reading out the digital broadcasting information from the information storage unit and reproducing the same on a display device. Therefore, when received digital broadcasting information is disallowed to be copied to an external recording device, the received digital broadcasting information is internally and temporarily stored, and at the same time when this signal is being output, the digital broadcasting information which has been temporarily stored and successively read out, is simultaneously erased, whereby the copyright protection for the received digital broadcasting information can be realized.

According to a second aspect of the present invention, the digital broadcasting receiver of the first aspect of the present invention comprises pointer control means for controlling a reading position where information is read out from the information storage unit when digital broadcasting information is reproduced from the information storage unit. The pointer control means includes: a reading pointer for pointing to the reading position where digital broadcasting information is read out from the information storage unit, and an erasing pointer for pointing to a position where the digital broadcasting information is erased after it is read out, i.e., pointing to a position which has been pointed to by the reading pointer. Therefore, when a video signal is output, the stored video signal which has been finished in being output is simultaneously erased by utilizing an overwriting function of a storage device and a function of controlling plural pointers, whereby the copyright protection is realized.

According to a third aspect of the present invention, a digital broadcasting receiver comprises: a tuner unit for receiving digital broadcasting information including copyright information which shows whether copying to an external device is allowed or not, and for detecting the copyright information in the received digital information; an information storage unit for storing the received digital broadcasting information together with the copyright information in the received digital broadcasting information, and a decoder unit for decoding the received digital broadcasting information; or digital broadcasting information read out from the information storage unit into an output signal in a form to be displayed. When a copy-disallowance signal included in the copyright information in the received digital broadcasting information is detected while the received digital broadcasting information is stored in the information storage unit during receiving digital broadcasting information, the digital broadcasting receiver inhibits outputting the received digital broadcasting information as an output signal in a form to be displayed through the decoder unit. Therefore, the copyright protection is further reinforced.

According to a fourth aspect of the present invention, the digital broadcasting receiver of the third aspect of the present invention inhibits, when a copy-disallowance signal included in the copyright information in the received digital information is detected while the received digital broadcasting information is stored in the information storage unit, outputting the received digital broadcasting information as an output signal in a form to be displayed through the decoder unit, and outputs a message screen signal, which is prepared in advance, to an output unit for outputting an output signal in a form to be displayed through the decoder unit. Therefore, the operation for the copyright protection is further clarified.

BRIEF DESCRIPTION OF THE DRAWINGS

FIG. 8 is a diagram showing, as a table, a control method by an output control unit 27 in the first embodiment of the present invention.

FIG. 9 is a diagram showing, as a table, a control method by an output control unit 67 in the second embodiment of the present invention.

DETAILED DESCRIPTION OF THE INVENTION

Hereinafter, embodiments of the present invention will be described with reference to FIGS. 1 to 7.
First Embodiment A first embodiment will be described with reference to FIGS. 1, 2, 3, and 4.

Figure 1:
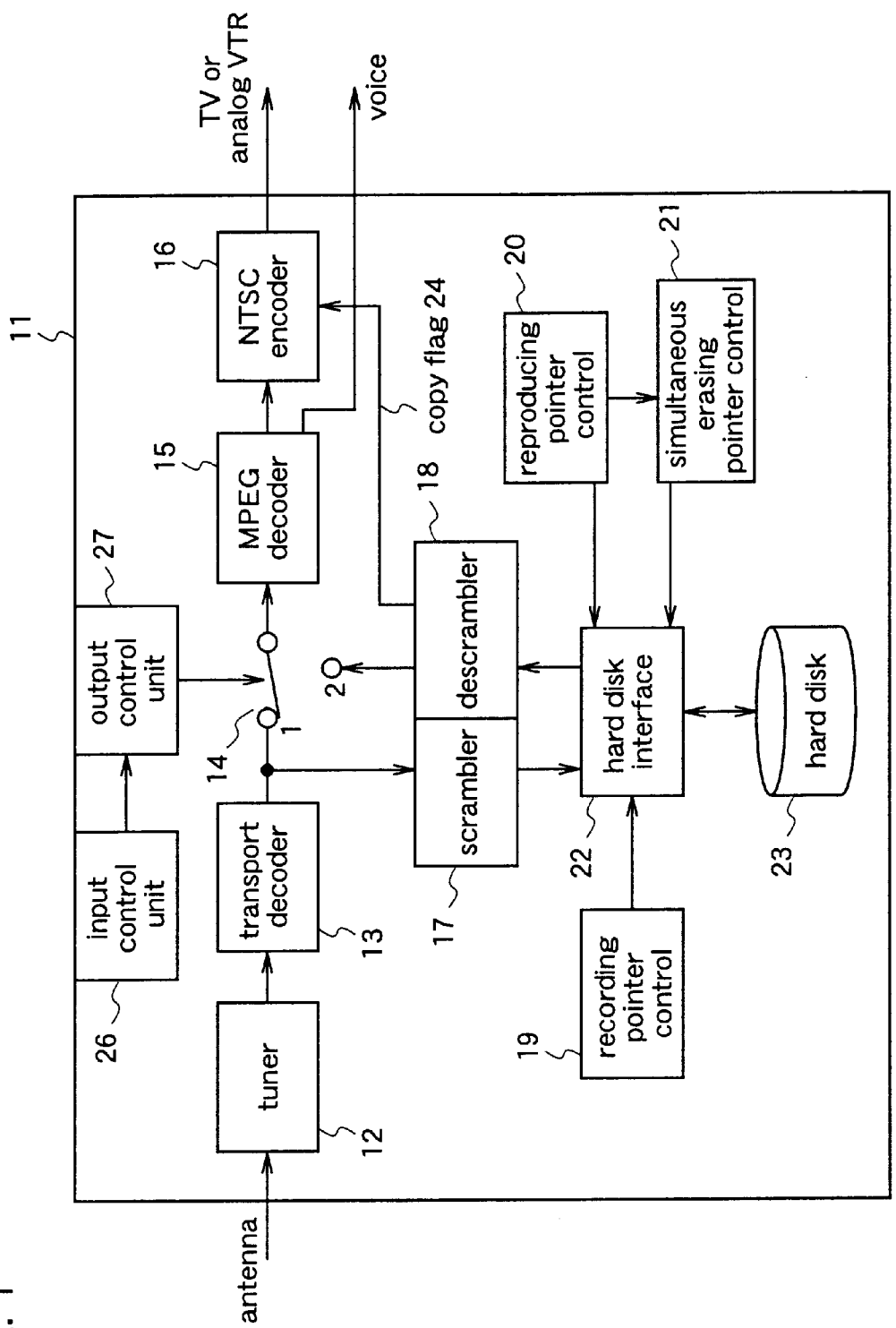
FIG. 1 is a block diagram illustrating a digital broadcasting receiver according to a first embodiment of the present invention.

FIG. 1 is a block diagram illustrating a digital broadcasting receiver according to the first embodiment of the present invention. In FIG. 1, reference numeral 11 denotes a digital broadcasting receiver. Numeral 12 denotes a tuner. Numeral 13 denotes a transport decoder. Numeral 14 denotes a selector switch. Numeral 15 denotes an MPEG decoder. Numeral 16 denotes an NTSC encoder. Numeral 17 denotes a scrambler. Numeral 18 denotes a descrambler. Numeral 19 denotes a recording pointer control unit. Numeral 20 denotes a reading (reproducing) pointer control unit. Numeral 21 denotes a simultaneous erasing pointer control unit. Numeral 22 denotes a hard disk interface. Numeral 23 denotes a hard disk. Numeral 26 denotes an input operation control unit. Numeral 27 denotes an output control unit. The reading (reproducing) pointer control unit 20 and the simultaneous erasing pointer control unit 21 can be collectively referred to as a pointer controller, and the pointer controller, the descrambler 18, and the hard disk interface 22 can be collectively referred to as a control arrangement.

Hereinafter, an operation of the digital broadcasting receiver having a structure according to the first embodiment will be described.

The tuner 12 is connected to an antenna. Digital broadcasting received by the tuner 12 is digital-demodulated, and the demodulated broadcasting is input into the transport decoder 13 as a data sequence in the form of a transport stream. The data sequence in a transport stream includes a plurality of programs and control information multiplexed therein, and one of the programs is selected among the plurality of the programs by the transport decoder 13.

As operation states of the apparatus according to the first embodiment, which can be selected by an operation of a user through the input operation unit 26, there are following three states:

1) "direct receiving"—receiving digital broadcasting and reproducing the same upon receipt;

2) "indirect receiving and storing"—receiving digital broadcasting and storing the same without reproducing the same upon receipt; and
3) "indirect receiving and reproducing"—reproducing the digital broadcasting which is received by the "indirect receiving".

These three states of "direct receiving", "indirect receiving and storing", and "indirect receiving and reproducing" can be assigned by an input from an operator through the input operation unit 26. In response to the assignment of the three states from the input operation unit 26, the output control unit 27 switches the selector switch (SW) 14 referring to a state of a copy flag, as shown in the table of FIG. 8.

Hereinafter, detailed descriptions are given for operations in the above-described three states.

Initially, in the "direct receiving" state, when "direct receiving" is assigned from the input operation unit 26, the selector switch 14 is switched to be connected to the transport decoder 13 controlled by the output control unit 27 (SW 14 is switched to 1, see FIG. 8). The program data of a program selected by the transport decoder 13 is MPEG-decoded by the MPEG decoder 15, and a digital video image (signal) and a voice signal are output. The digital video signal among those is converted into a television signal by the NTSC encoder 16 and the television signal is output.

Figure 2:
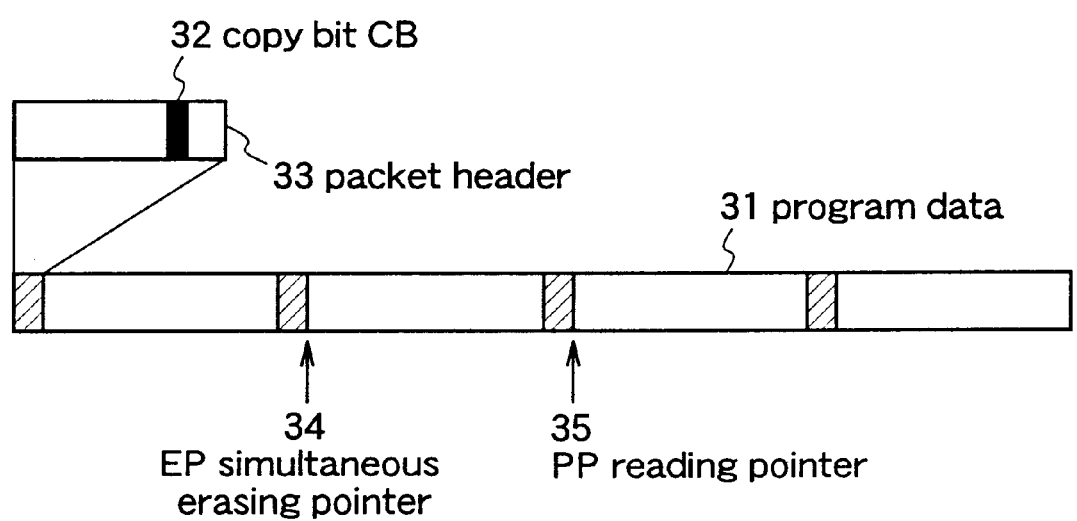
FIG. 2 is a diagram schematically illustrating a structure of program data in the first and second embodiments of the present invention.

FIG. 2 shows a stream structure of the program data selected by the transport decoder 13. Numeral 31 denotes a program data. Numeral 32 denotes a copy bit CB constituting a copy flag. Numeral 33 denotes a packet header. In FIG. 2, the program data 31 selected by the transport decoder 13 comprises packets, and each packet has a packet header 33. The packet header 33 includes a copy bit (CB) 32 indicating a copy flag concerning copyright information. Here, CB=0 means that copying to an external device is allowed and CB=1 means that copying to an external device is disallowed.

When this apparatus performs an "indirect receiving" operation relating to the "indirect receiving and storing" or "indirect receiving and reproducing", the scrambler 17, the descrambler 18, the recording pointer control unit 19, the reading pointer control unit 20, the simultaneous erasing pointer control unit 21, the hard disk interface 22, and the hard disk 23 elements shown in FIG. 1 are employed.

Figure 3:
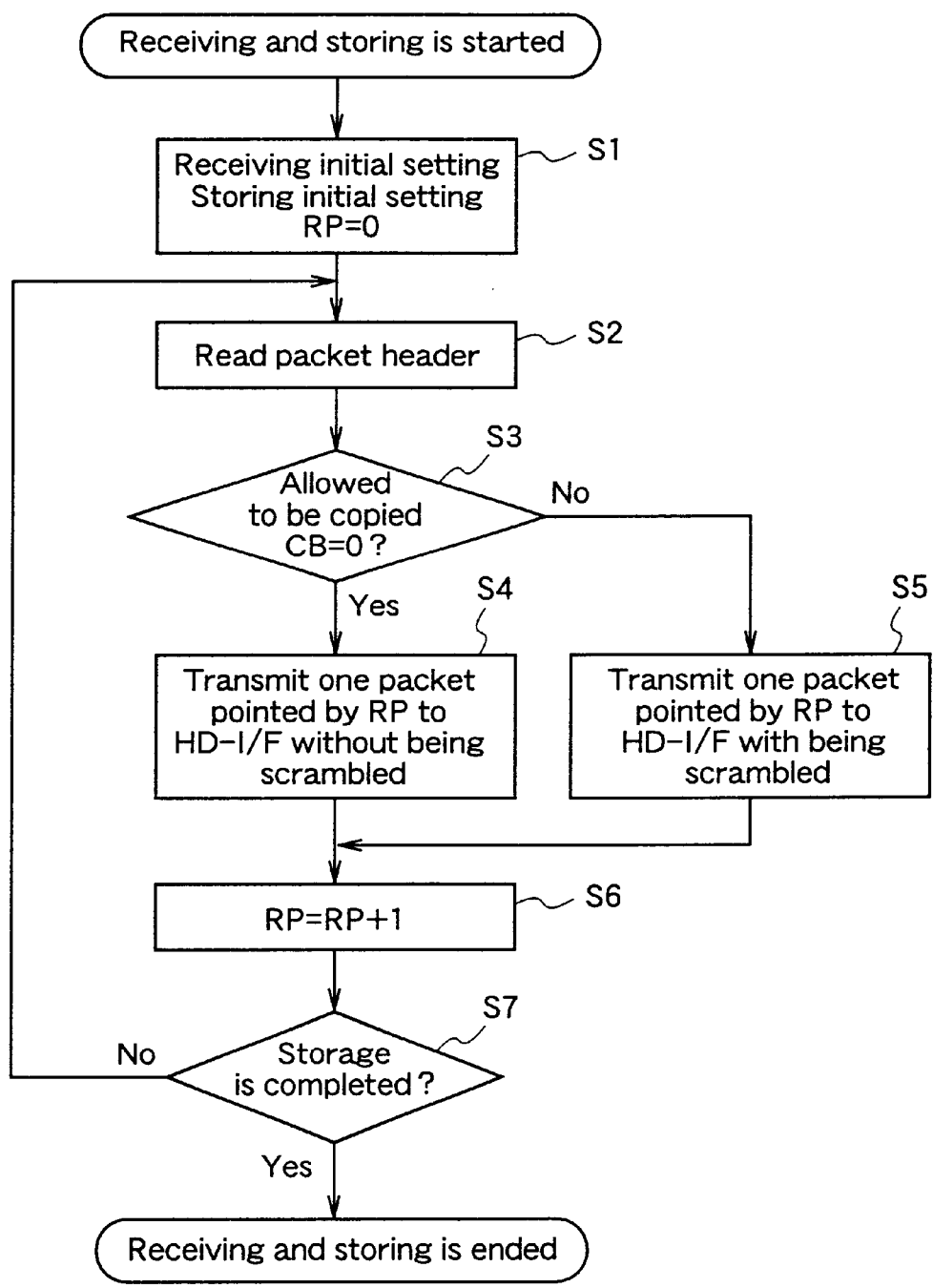
FIG. 3 is a flowchart showing a storing operation in the first embodiment of the present invention.

FIG. 3 is a flowchart showing a control procedure for storing in the "indirect receiving and storing" operation among the above-described "indirect receiving" operations. As shown in FIG. 3, when the "indirect receiving and storing" is started, initial settings of a receiving initial setting, a storing initial setting, and RP=0 are carried out in step S1. Then, in step S2, the packet header 33 of the program data 31 is examined by the scrambler 17 and the copy flag 32 included therein is judged in step S3. When CB=0, it proceeds to step S4 where data of one packet is pointed to by the recording pointer RP and is transmitted to the hard disk interface (HD-I/F) 22 without being scrambled. When CB=1 in step S3, it proceeds to step S5, and data of one packet pointed to by the recording pointer RP is scrambled and transmitted to the hard disk interface (HD-I/F) 22. The scrambling of data means that data conversion is performed with a specific key for the content of a packet. When data is being stored onto the hard disk 23 in a state of "indirect receiving and storing" and where the copy bit shows the disallowance of copying, the selector switch 14 is in an open state.

Then, in step S6, referring to the value of the recording pointer RP, the pointer RP pointing to the packet to be stored is incremented by one in the hard disk interface 22, and the program data is transmitted to the hard disk 23, as described above. In step S7, it is decided whether the storage is completed. In this way, the received program data having a time length which is set by the operator is stored in the hard disk 23. As described above, data of one packet pointed to by the recording pointer RP is transmitted to the hard disk interface (HD-I/F)22 regardless of whether CB=0 or CB=1. Accordingly, reserved digital broadcasting information is stored in the hard disk 23 irrespective of whether copying the received digital broadcasting information to an external device is allowed or not.

Then, the program data stored in the hard disk 23 is read out from the hard disk 23 and is output through the hard disk interface 22 in the "indirect receiving and reproducing" operation among the above-described "indirect receiving" operations. In this case, as shown in FIG. 1, the selector switch 14 is switched to the side of the descrambler 18 (SW is switched to 2, see FIG. 8), whereby the descrambler 18 is connected with the MPEG decoder 15.

Figure 4:
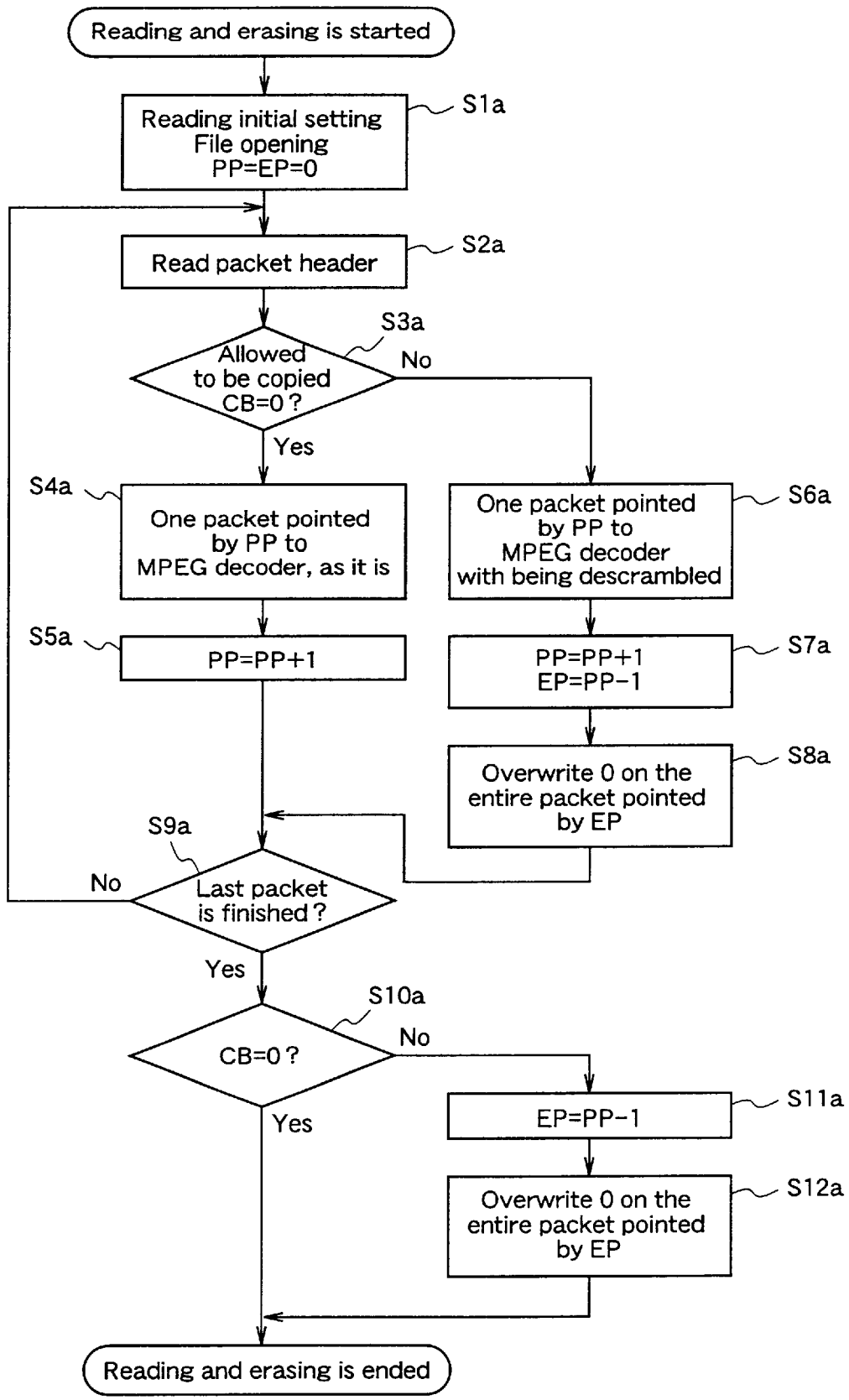
FIG. 4 is a flowchart showing a reading and erasing operation in the first and second embodiments of the present invention.

FIG. 4 is a flowchart showing a control procedure for reading and erasing in the "indirect receiving and reproducing" operation among the above-described "indirect receiving" operations.

As shown in FIG. 4, when reading is started, initial settings of a reading initial setting, a file opening, a reading pointer PP=0, and a simultaneous erasing pointer EP=0 are performed, and then the hard disk interface 22 reads out the stored program data 31, as shown in FIG. 2, in step S1*a*.

The reading pointer PP is operable to point to a position where reading is to be performed. In step S2*a*, a packet header pointed to by the reading pointer PP is read out. In step S3*a*, a copy flag CB included in the packet header 33 is judged in the descrambler 18. In accordance with the value of the copy flag CB, it proceeds to step S4*a* when CB=0, and data of one packet pointed to by the reading pointer PP is transmitted to the MPEG decoder 15 as it is. Then, in step S5*a*, the reading pointer PP is incremented by one, and the process beginning with Step S2*a* is continued until the processing for the last packet is finished (this is judged in step S9*a*).

When it is judged that CB=1 for the packet header in the read packet in step S3*a*, it proceeds to step S6*a*. Since the data of one packet pointed to by the reading pointer PP has been scrambled, the data is descrambled by the descrambler 18 and is transmitted to the MPEG decoder 15. Further, when it is judged CB=1 for this packet header of the read packet, the reading pointer PP, in step S7*a*, is incremented by one for the next reading and the simultaneous erasing pointer EP is made to have a value which is smaller than the value of the reading pointer PP which is incremented by one. Then, in step S8*a*, 0 is overwritten onto the entire data of the packet pointed by the simultaneous erasing pointer EP, thereby erasing the data of the packet, the reading of which is already finished. While performing the above-described pointer control, the process beginning with Step 2*a* is continued until the processing for the last packet is finished (this is judged in step S9*a*).

When it is judged YES in step S9*a*, i.e., when reading from the last packet is finished, the reading-and-erasing processing is ended when it is judged that CB=0 in step S10*a*. When it is judged that CB=1, it proceeds through step S11*a* to step S12*a* where the erasing processing with employing the overwriting is performed for the last packet, thereby performing final erasing, and finishing the reading-and-erasing processing.

The program data which is controlled to be stored and to be read out as described above is, as shown in FIG. 1, transmitted to the MPEG decoder 15 to be decoded thereby, and a digital video image and a voice are output. The digital video signal is converted into a television signal by the NTSC encoder 6 and the television signal is output. In the descrambler 18, the copy flag CB is separated from the packet header, and the copy flag information 24 is used to control the NTSC encoder 16. When it is judged that CB=1, the NTSC encoder 16 inserts a copy protect pulse into the television signal which is output from the NTSC encoder 16, and the NTSC encoder 14 outputs the program data as a copy-guarded signal.

As described above, according to this first embodiment, in order to reproduce the received broadcasting at a time later than when the broadcasting is received, the received broadcasting is temporarily stored, and the stored broadcasting is read out to be output later and a copy-disallowance signal for inhibiting copying to an external recording device is stored together with the received broadcasting. Consequently, when the received broadcasting is read out and output, if the copy-disallowance signal is detected, the received and stored broadcasting is read out and output as well as simultaneously erased by performing the above-described overwriting, thereby satisfying the condition of disallowance for copying to an external recording device.

In the first embodiment, the method of reading and outputting as well as simultaneously erasing the received and stored broadcasting is achieved by performing overwriting which employs the simultaneous erasing pointer EP. However, this method of performing reading and outputting as well as simultaneous erasing can also be achieved by other methods of erasing stored video information associated with performing reading and outputting.

Further, in the first embodiment, the hard disk 23 is used as a unit for temporarily storing the received digital broadcasting information. However, any high-speed storage devices such as disk devices or semiconductor memories can be similarly employed.

Second Embodiment

Next, a second embodiment will be described with reference to FIGS. 2, 4, 5 and 6.

Figure 5:
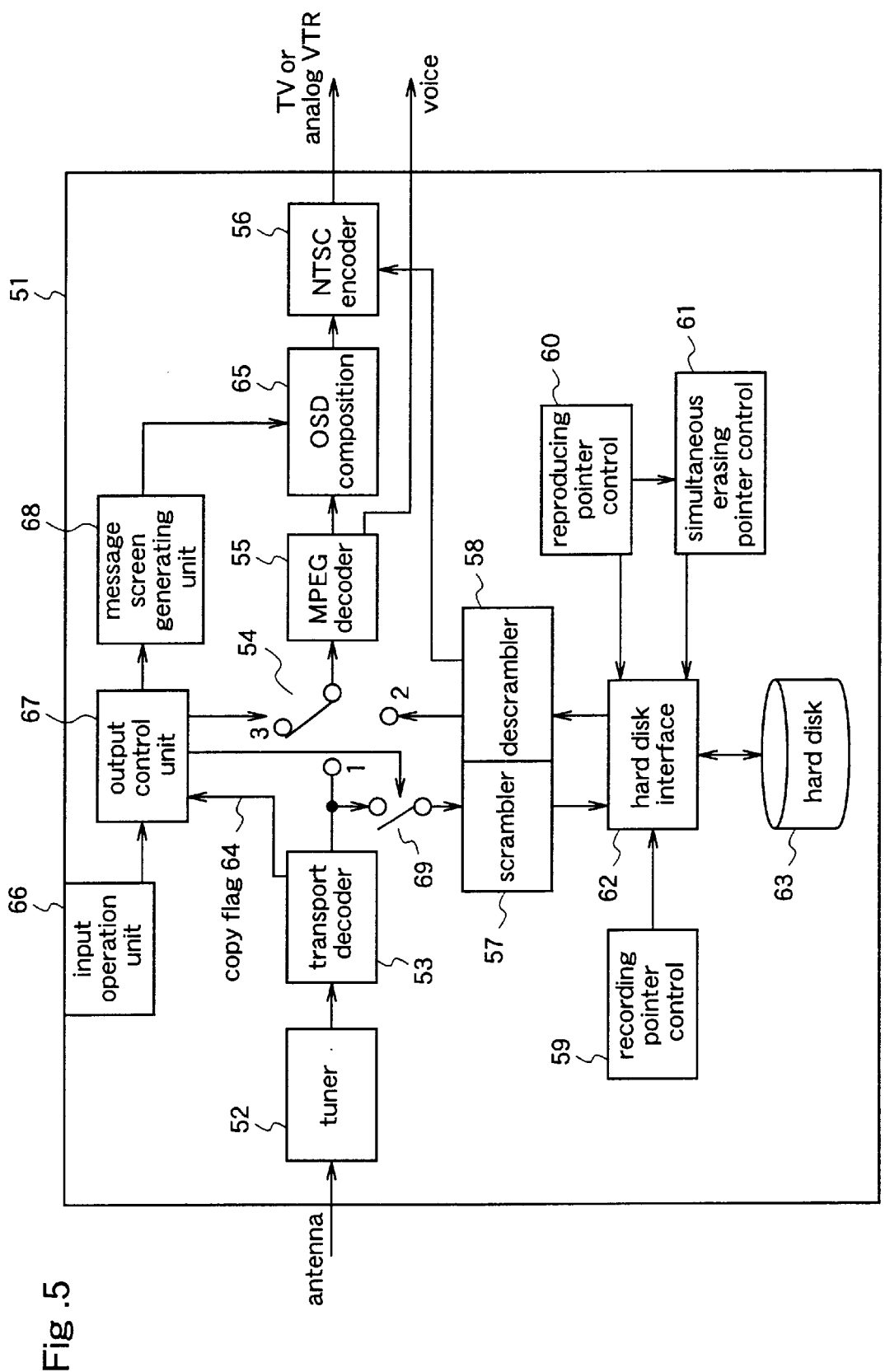
FIG. 5 is a block diagram illustrating a digital broadcasting receiver according to the second embodiment of the present invention.

FIG. 5 is a block diagram illustrating a digital broadcasting receiver according to the second embodiment. In FIG. 5, reference numeral 51 denotes a digital broadcasting receiver. Numeral 52 denotes a tuner. Numeral 53 denotes a transport decoder. Numeral 54 denotes a selector switch (SW). Numeral 55 denotes an MPEG decoder. Numeral 56 denotes an NTSC encoder. Numeral 57 denotes a scrambler. Numeral 58 denotes a descrambler. Numeral 59 denotes a recording pointer control unit. Numeral 60 denotes a reading (reproducing) pointer control unit. Numeral 61 denotes a simultaneous erasing pointer control unit. Numeral 62 denotes a hard disk interface. Numeral 63 denotes a hard disk drive. Numeral 64 denotes a copy flag. Numeral 65 denotes an OSD (On Screen Demand) screen composition unit. Numeral 66 denotes an input operation unit. Numeral 67 denotes an output control unit. Numeral 68 denotes a message screen generating unit. Numeral 69 denotes a selector switch (SW). The descrambler 58, the reading (reproducing) pointer control unit 60, the simultaneous erasing pointer control unit 61, and the hard disk interface 62 can be collectively referred to as a control arrangement.

Hereinafter, an operation of the digital broadcasting receiver having a structure according to the second embodiment will be described.

The tuner 52 is connected to the antenna. Digital broadcasting received by the tuner 52 is digital-demodulated, and the demodulated broadcasting is input to the transport decoder 53 as a data sequence in the form of a transport stream. The data sequence in a transport stream includes a plurality of programs and control information multiplexed therein, and one of the programs is selected among the plurality of the programs by the transport decoder 53.

As operation states of the apparatus according to the second embodiment which can be selected by an operation of a user through the input operation unit 66, there are following three states, which are the same as those in the first embodiment:

1) "direct receiving"—receiving digital broadcasting and reproducing the same upon receipt;
2) "indirect receiving and storing"—receiving digital broadcasting and storing the same without reproducing the same upon receipt; and
3) "indirect receiving and reproducing"—reproducing the digital broadcasting which is received by the "indirect receiving and storing".

These three states of "direct receiving", "indirect receiving and storing", and "indirect receiving and reproducing", can be assigned by an input from an operator through the input operation unit 66. In response to the assignment of the three states from the input operation unit 66, the output control unit 67 switches the selector switch 54 and switches the selector switch 69, referring to a state of a copy flag, as shown in a table of FIG. 9.

Hereinafter, detailed descriptions are given for operations in the above-described three states.

Initially, in the "direct receiving", when "direct receiving" is assigned from the input operation unit 66, the selector switch 54 is switched to be connected to the transport decoder 53 side (SW is switched to 1, see FIG. 9), regardless of whether copying is allowed or disallowed, and the selector switch 69 is made in a connected state when copying is allowed, and is made open when copying is disallowed, controlled by the output control unit 67. In the "direct receiving" state, the program data is MPEG-decoded by the MPEG decoder 55 and a digital video image (signal)and a voice signal are output. When copying is allowed, the program data is stored in the hard disk 63 via the scrambler 57 because the selector switch 69 is turned on. On the other hand, when copying is disallowed, the data is not stored in the hard disk 63 because the selector switch 69 is turned off. In addition, the digital video signal of the program data transmitted to the MPEG decoder 55 side passes through the OSD composition unit 65, and is converted into a television signal by the NTSC encoder 56 and the television signal is output.

FIG. 2 shows a stream structure of the program data selected by the transport decoder 53, which is the same as that in the first embodiment. Numeral 31 denotes a program data. Numeral 32 denotes a copy flag CB. Numeral 33 denotes a packet header. In FIG. 2, the program data 31 selected by the transport decoder 53 comprises packets, and each packet has a packet header 33. The packet header 33 includes a copy bit (CB) 32 indicating the copy flag concerning copyright information. Here, CB=0 means that copying to an external device is allowed and CB=1 means that copying to an external device is disallowed.

In the "indirect receiving and reproducing" or "indirect receiving and storing" operation, the scrambler 57, the descrambler 58, the recording pointer control unit 59, the reading (reproducing) pointer control unit 60, the simultaneous erasing pointer control unit 61, the hard disk interface 62, the hard disk drive 63, the OSD composition unit 65, the output control unit 67, and the message screen generating unit 68 elements shown in FIG. 5 are employed.

When the input operation unit 66 is in the "indirect receiving and storing" state, the output control unit 67 switches the selector SW 54 in accordance with the state of the copy bit 32 of the received digital information. Then, the selector SW 69 is in a connected state in both cases when copying is allowed and when it is disallowed. This has an object of limiting the number of times the viewer can view a broadcasting program, which is protected under the copyright and for which program accounting is performed for each of the programs, so as to perform "storing" and "reproducing" of the broadcasting program in the "indirect receiving", to one time. For that purpose, in the "indirect receiving and storing" state, when the received digital signal is disallowed to be copied, a control procedure as described below is to be performed to inhibit outputting a video image of the received signal.

Figure 6:
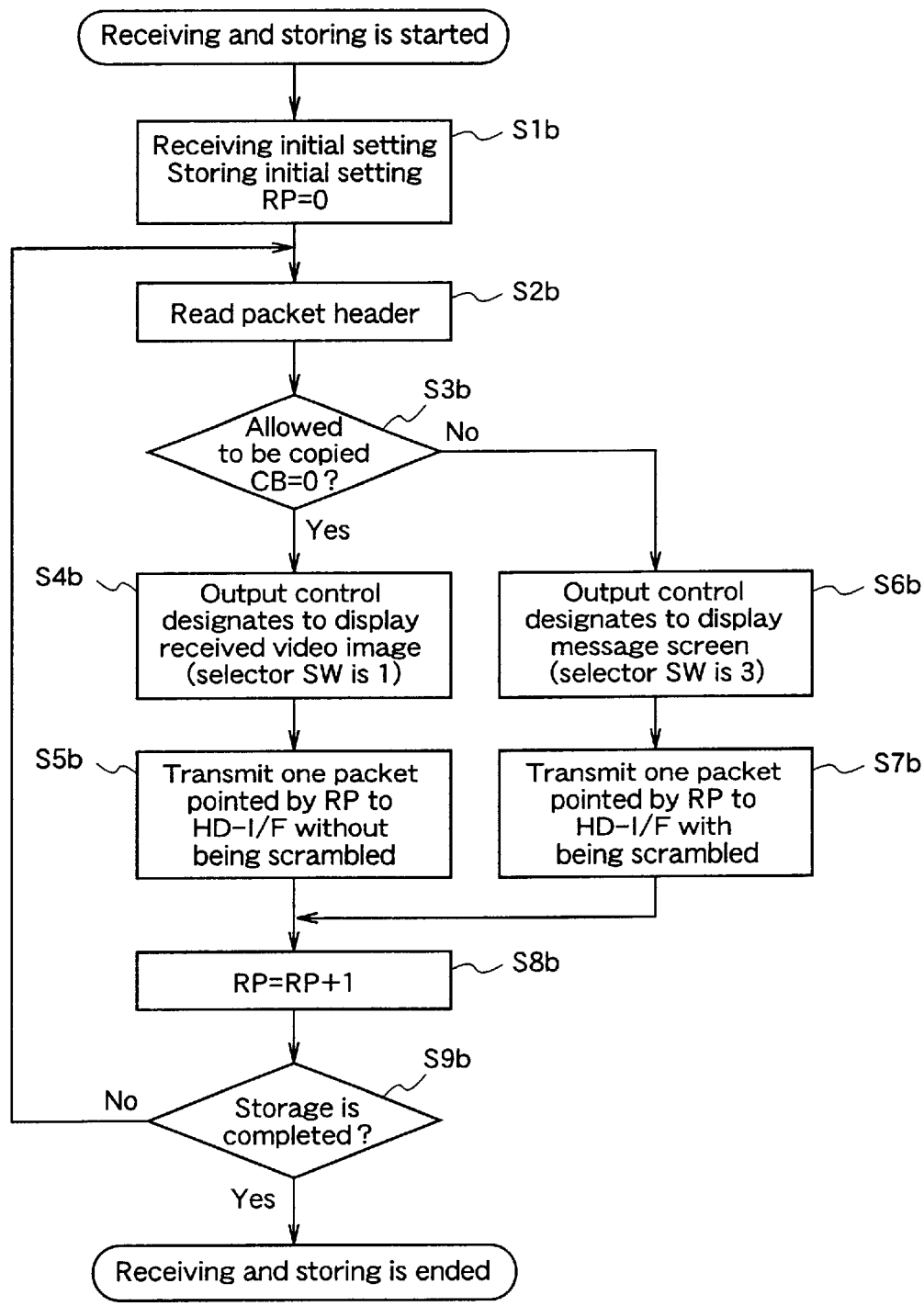
FIG. 6 is a flowchart showing a stroing operation in the second embodiment of the present invention.
Figure 7:
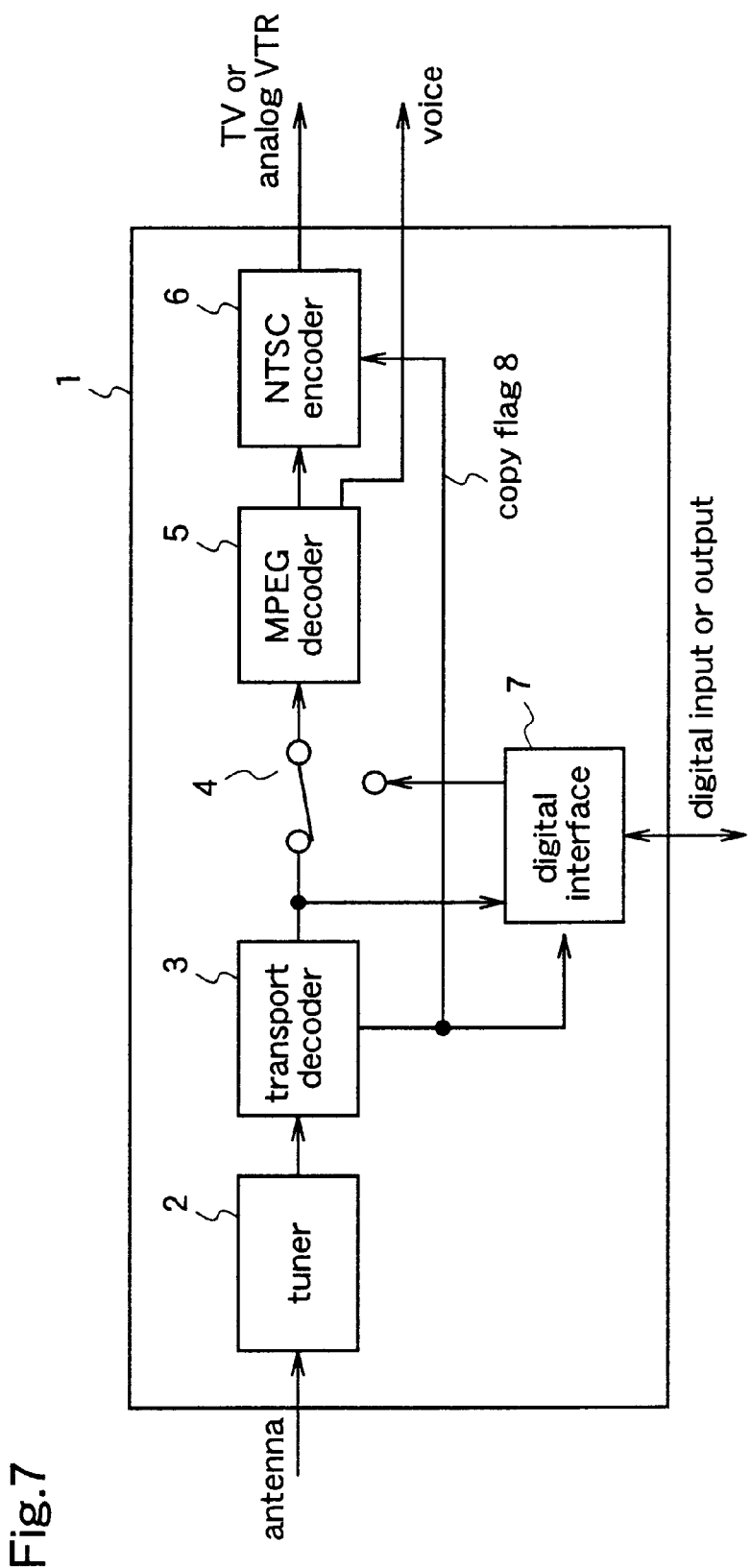
FIG. 7 is a block diagram illustrating a prior art digital broadcasting receiver.

FIG. 6 is a flowchart showing the control procedure for the "indirect receiving and storing" operation. As shown in FIG. 6, when the "receiving and storing" operation is started, initial settings of a receiving initial setting, a storing initial setting, and RP=0 are carried out in step S1b. Then, in step S2b, the packet header 33 of the program data 31 is examined by the scrambler 17 and the copy flag 32 included therein is judged in step S3b. When it is judged to be CB=0, it proceeds to step S4b and the output control unit 67 assigns "display the received video image". In this case, the selector switch 54 is switched to be connected to the side of the transport decoder 53, which is the side of a terminal of "1" and the selector switch 69 is made into the connected state. Then in step S5b, the received packet pointed by the recording pointer RP is transmitted to the hard disk interface (HD-I/F) 62 without being scrambled.

When it is judged that CB=1 in step S3b, it proceeds to step S6b, and the output control unit 67 assigns "display a message screen", and the selector switch 54 is switched to be disconnected and the selector switch 69 is made into the connected state. At this time, the message screen generating unit 68 generates a message showing "the received picture cannot be displayed during the recording operation due to the copyright protection", and the message is displayed on the screen through the OSD composition unit 65. Then in step S7b, data of one packet pointed to by the recording pointer RP is scrambled and transmitted to the hard disk interface (HD-I/F) 62. Scrambling of data means that data conversion is performed with a specific key for the content of the packet. Then, in step S8b, referring to the value of the recording pointer RP, the pointer RP pointing to the packet to be stored is incremented by one in the hard disk interface (HD-I/F) 62, and the program data is transmitted to the hard disk 63. In step S9b, it is judged whether the storage is completed, and when the storage is completed, the received program data having a time length which is set by the operator is stored in the hard disk 63. As described above, data of one packet pointed to by the recording pointer RP is transmitted to the hard disk interface (HD-I/F) 62 irrespective of whether CB=0 or CB=1. Accordingly, received digital broadcasting information is stored in the hard disk 63 irrespective of whether copying the received digital broadcasting information to an external device is allowed or not.

When the input operation unit 66 assigns the "indirect receiving and reproducing" state, the program data stored in the hard disk 63 is read out from the hard disk 63 and is output through the hard disk interface (HD-I/F) 62. At this time, as shown in FIG. 5, the output control unit 67 judges the operation state and controls the selector switch 54 to connect the descrambler 58 with the MPEG decoder 55 (SW is switched to 2, see FIG. 9). Here, the selector switch 69 can be made either in the connected state or in an open state.

FIG. 4 is a flowchart showing a control procedure for the "indirect receiving and reproducing" operation. The operation at this time is similar to the above-described operation, and thus the description thereof is omitted.

As described above, according to this second embodiment, when a copy-disallowance signal is stored during the "indirect receiving and storing" operation, in order to assure the copyright protection, outputting of a received video signal is inhibited and a message screen is displayed in place of the received video signal, whereby the number of times of viewing the program which is under the copyright protection is limited to only one time. Therefore, when a program which is severely protected under the copyright, such as pay broadcasting, and for which program accounting is performed upon receipt of each program, is received, and even when the viewing time is later shifted, the number of viewing times can be limited to only one time and the protection of the copyright is assured.

INDUSTRIAL APPLICABILITY

According to the digital broadcasting receiver of the present invention, when a received video signal is disallowed to be copied to an external recording device, the digital broadcasting receiver enables viewing the broadcasting by shifting to a later viewing time, even when the broadcasting cannot be viewed upon receipt, and the digital broadcasting receiver of the present invention realizes the protection of copyright severely also in that case.

What is claimed is:

1. A digital broadcasting receiver comprising:

a tuner unit operable to receive digital broadcasting information including copyright information indicating whether copying the received digital broadcasting information to an external device is allowed, to detect the copyright information included in the received digital broadcasting information, and to output the received digital broadcasting information including the detected copyright information;

an information storage unit operable to receive and store the received digital broadcasting information, together with the detected copyright information, irrespective of whether the detected copyright information indicates that copying the received digital broadcasting information to an external device is allowed or disallowed; and a decoder unit operable to read out and receive the received digital broadcasting information from said information storage unit, and to decode and reproduce the received digital broadcasting information read out from said information storage unit into an output signal in a form to be displayed, wherein when a copy-disallowance signal is detected in the received digital broadcasting information read out from said information storage unit, the received digital broadcasting information which is stored in said information storage unit and which has been successively read out therefrom and received by said decoder unit is reproduced by said decoder unit and simultaneously erased.

2. The digital broadcasting receiver according to claim 1, further comprising:

a pointer controller operable to control a reading position where information is read out from said information storage unit when the received digital broadcasting information is read out from said information storage unit and reproduced by said decoder unit, wherein said pointer controller comprises a reading pointer operable to point to the reading position where the received digital broadcasting information is read out from said information storage unit, and an erasing pointer operable to point to a position where the received digital broadcasting information is erased after being read out from said information storage unit, wherein the position to which the erasing pointer points is the reading position to which the reading pointer previously pointed.

3. The digital broadcasting receiver according to claim 1, wherein said tuner unit is further operable to demodulate the digital broadcasting information received by said tuner unit, and to output the demodulated digital broadcasting information as a data sequence in a transport stream having a plurality of program data and control information multiplexed therein.

4. The digital broadcasting receiver according to claim 3, further comprising a transport decoder arranged and configured between said tuner unit and said information storage unit, wherein said transport decoder is operable to receive the demodulated digital broadcasting information outputted by said tuner unit and to select one of the program data among the plurality of program data multiplexed in the transport stream.

5. The digital broadcasting receiver according to claim 1, further comprising a scrambler arranged and configured between said tuner unit and said information storage unit, wherein said scrambler is operable to scramble the received digital broadcasting information when the detected copyright information included in the received digital broadcasting information indicates that copying the received digital broadcasting information to an external device is disallowed, and to output the scrambled received digital broadcasting information to said information storage unit.

6. The digital broadcasting receiver according to claim 5, further comprising a descrambler arranged and configured between said information storage unit and said decoder unit, wherein said descrambler is operable to read out and receive the scrambled received digital broadcasting information from said information storage unit, to descramble the scrambled received digital broadcasting information upon being read out from said information storage unit, and to output the descrambled received digital broadcasting information to said decoder unit.

7. The digital broadcasting receiver according to claim 6, wherein said descrambler is further operable to separate the copyright information included in the received digital broadcasting information from program data included in the received digital broadcasting information.

8. The digital broadcasting receiver according to claim 1, further comprising a recording pointer operable to successively point to packets of the received digital broadcasting information until each packet of the received digital broadcasting information is stored in said information storage unit.

9. The digital broadcasting receiver according to claim 1, wherein said decoder unit is operable to reproduce the received digital broadcasting information as a video signal.

10. The digital broadcasting receiver according to claim 9, wherein said decoder unit is further operable to reproduce and output the video signal as a copy-guarded signal when the detected copyright information included in the received digital broadcasting information indicates that copying the received digital broadcasting information to an external device is disallowed.

11. The digital broadcasting receiver according to claim 1, wherein said decoder unit is operable to reproduce the received digital broadcasting information as a video signal and a voice signal.

12. A digital broadcasting receiver comprising:

a tuner unit operable to receive digital broadcasting information including copyright information indicating whether copying the received digital broadcasting information to an external device is allowed, to detect the copyright information included in the received digital broadcasting information, and to output the received digital broadcasting information including the detected copyright information, an information storage unit operable to receive and store the received digital broadcasting information, together with the detected copyright information, irrespective of whether the detected copyright information indicates that copying the received digital broadcasting information to an external device is allowed or disallowed; and a decoder unit operable to read out and receive the received digital broadcasting information from said information storage unit, and to decode and reproduce the received digital broadcasting information read out from said information storage unit into an output signal in a form to be displayed, wherein when a copy-disallowance signal is detected in the received digital broadcasting information while the received digital broadcasting information is being stored in said information storage unit, said decoder unit, instead of reproducing the received digital broadcasting information read out from said information storage unit in the form to be displayed, outputs a signal indicating that reproduction of the received digital broadcast information is inhibited.

13. The digital broadcasting receiver of claim 12, further comprising an output unit operable to receive and output a signal outputted by said decoder unit, wherein when a copy-disallowance signal is detected in the received digital broadcasting information while the received digital broadcasting information is being, stored in said information storage unit, said decoder unit, instead of outputting the received digital broadcasting information as the output signal in a form to be displayed, is operable to output a pre-generated message screen signal to said output unit so that said output unit displays the message screen signal.

14. The digital broadcasting receiver according to claim 12, wherein said tuner unit is further operable to demodulate the digital broadcasting information received by said tuner unit, and to output the demodulated digital broadcasting information as a data sequence in a transport stream having a plurality of program data and control information multiplexed therein.

15. The digital broadcasting receiver according to claim 14, further comprising a transport decoder arranged and configured between said tuner unit and said information storage unit, wherein said transport decoder is operable to receive the demodulated digital broadcasting information outputted by said tuner unit and to select one of the program data among the plurality of program data multiplexed in the transport stream.

16. The digital broadcasting receiver according to claim 12, further comprising a scrambler arranged and configured between said tuner unit and said information storage unit, wherein said scrambler is operable to scramble the received digital broadcasting information when the detected copyright information included in the received digital broadcasting information indicates that copying the received digital broadcasting information to an external device is disallowed, and to output the scrambled received digital broadcasting information to said information storage unit.

17. The digital broadcasting receiver according to claim 16, further comprising a descrambler arranged and configured between said information storage unit and said decoder unit, wherein said descrambler is operable to read out and receive the scrambled received digital broadcasting information from said information storage unit, to descramble the scrambled received digital broadcasting information upon being read out from said information storage unit, and to output the descrambled received digital broadcasting information to said decoder unit.

18. The digital broadcasting receiver according to claim 17, wherein said descrambler is further operable to separate the copyright information included in the received digital broadcasting information from program data included in the received digital broadcasting information.

19. The digital broadcasting receiver according to claim 12, further comprising a recording pointer operable to successively point to packets of the received digital broadcasting information until each packet of the received digital broadcasting information is stored in said information storage unit.

20. The digital broadcasting receiver according to claim 12, wherein said decoder unit is operable to reproduce the received digital broadcasting information as a video signal.

21. The digital broadcasting receiver according to claim 12, wherein said decoder unit is operable to reproduce the received digital broadcasting information as a video signal and a voice signal.

22. The digital broadcasting receiver according to claim 12, further comprising a pointer controller operable to control a reading position where information is read out from said information storage unit when the received digital broadcasting information is read out from said information storage unit and reproduced by said decoder unit, said pointer controller comprising a reading pointer operable to point to the reading position where the received digital broadcasting information is read out from said information storage unit.

23. A digital broadcasting receiver comprising:
  a tuner unit operable to receive digital broadcasting information including copyright information indicating whether copying the received digital broadcasting information to an external device is allowed, to detect the copyright information included in the received digital broadcasting information, and to output the received digital broadcasting information including the detected copyright information;
  an information storage unit operable to receive and store the received digital broadcasting information together with the detected copyright information;
  a control arrangement operable to read out and receive the received digital broadcasting information together with the detected copyright information from said information storage unit, to detect a copy-allowance signal or a copy-disallowance signal included in the received digital broadcasting information read out from said information storage unit, and to output the received digital broadcasting information;
  a decoder unit operable to receive the received digital broadcasting information from said control arrangement, and to decode and reproduce the received digital broadcasting information read out from said information storage unit by said control arrangement into an output signal in a form to be displayed, wherein said control arrangement, upon detecting the copy-disallowance signal included in the received digital broadcasting information read out from said information storage unit, is further operable to erase the received digital broadcasting information read out from said information storage unit while simultaneously causing said decoder to reproduce the received digital broadcasting information read out from said information storage unit.

24. The digital broadcasting receiver according to claim 23, wherein said control arrangement comprises a pointer controller operable to control a reading position where information is read out from said information storage unit when the received digital broadcasting information is read out from said information storage unit by said control arrangement and reproduced by said decoder unit, wherein said pointer controller comprises:
  a reading pointer operable to point to the reading position where the received digital broadcasting information is read out from said information storage unit; and
  an erasing pointer operable to point to a position where the received digital broadcasting information is erased after being read out from said information storage unit, wherein the position to which the erasing pointer points is the reading position to which the reading pointer previously pointed.

25. The digital broadcasting receiver according to claim 23, wherein said tuner unit is further operable to demodulate the digital broadcasting information received by said tuner unit, and to output the demodulated digital broadcasting information as a data sequence in a transport stream having a plurality of program data and control information multiplexed therein.

26. The digital broadcasting receiver according to claim 25, further comprising a transport decoder arranged and configured between said tuner unit and said information storage unit, wherein said transport decoder is operable to receive the demodulated digital broadcasting information outputted by said tuner unit, to select one of the program data among the plurality of program data multiplexed in the transport system, and to output the selected program data.

27. The digital broadcasting receiver according to claim 23, further comprising a scrambler arranged and configured between said tuner unit and said information storage unit, wherein said scrambler is operable to scramble the received digital broadcasting information when the detected copyright information included in the received digital broadcasting information indicates that copying the received digital broadcasting information to an external device is disallowed, and to output the scrambled received digital broadcasting information to said information storage unit.

28. The digital broadcasting receiver according to claim 27, wherein said control arrangement comprises a descrambler operable to read out and receive the scrambled received digital broadcasting information from said information storage unit, to descramble the scrambled received digital broadcasting information upon being read out from said information storage unit, and to output the descrambled received digital broadcasting information to said decoder unit.

29. The digital broadcasting receiver according to claim 23, further comprising a recording pointer operable to successively point to packets of the received digital broadcasting information until each packet of the received digital broadcasting information is stored in said information storage unit.

30. A digital broadcasting receiver comprising:
  a tuner unit operable to receive digital broadcasting information including copyright information indicating whether copying the received digital broadcasting information to an external device is allowed, to detect the copyright information included in the received digital broadcasting information, and to output the received digital broadcasting information including the detected copyright information;

an information storage unit operable to receive and store the received digital broadcasting information together with the detected copyright information;

a control arrangement operable to read out and receive the received digital broadcasting information together with the detected copyright information, to detect a copy-allowance signal or a copy-disallowance signal included in the received digital broadcasting information read out from said information storage unit, and to output the received digital broadcasting information;

a decoder unit operable to receive the received digital broadcasting information from said control arrangement, and to decode and reproduce the received digital broadcasting information read out from said information storage unit by said control arrangement into an output signal in a form to be displayed, wherein said control arrangement, upon detecting the copy-disallowance signal included in the received digital broadcasting information read out from said information storage unit, is further operable to inhibit said decoder from reproducing the received digital broadcasting information read out from said information storage unit in the form to be displayed.

31. The digital broadcasting receiver according to claim 30, further comprising an output unit operable to receive and output the output signal outputted by said decoder unit, wherein said control arrangement, upon detecting the copy-disallowance signal included in the received digital broadcasting information read out from said information storage unit, is operable to cause said decoder unit to output a pre-generated message screen signal in a form to be displayed, instead of reproducing the received digital broadcasting information in the form to be displayed, to said output unit so that said output unit outputs the message screen signal.

32. The digital broadcasting receiver according to claim 30, wherein said control arrangement comprises a pointer controller operable to control a reading position where information is read out from said information storage unit when the received digital broadcasting information is read out from said information storage unit and reproduced by said decoder unit, wherein said pointer controller comprises a reading pointer operable to point to the reading position where the received digital broadcasting information is read out from said information storage unit.

33. The digital broadcasting receiver according to claim 30, further comprising a scrambler arranged and configured between said tuner unit and said information storage unit, wherein said scrambler is operable to scramble the received digital broadcasting information when the detected copyright information included in the received digital broadcasting information indicates that copying the received digital broadcasting information to an external device is disallowed, and to output the scrambled received digital broadcasting information to said information storage unit.

34. The digital broadcasting receiver according to claim 33, wherein said control arrangement comprises a descrambler operable to read out and receive the scrambled received digital broadcasting information from said information storage unit, to descramble the scrambled received digital broadcasting information upon being read out from said information storage unit, and to output the descrambled received digital broadcasting information to said decoder unit.

35. The digital broadcasting receiver according to claim 30, further comprising a recording pointer operable to successively point to packets of the received digital broadcasting information until each packet of the received digital broadcasting information is stored in said information storage unit.

* * * * *